Dec. 11, 1956
I. A. LEAVELL
2,773,706
VALVED COUPLING
Filed Oct. 10, 1952
2 Sheets-Sheet 1
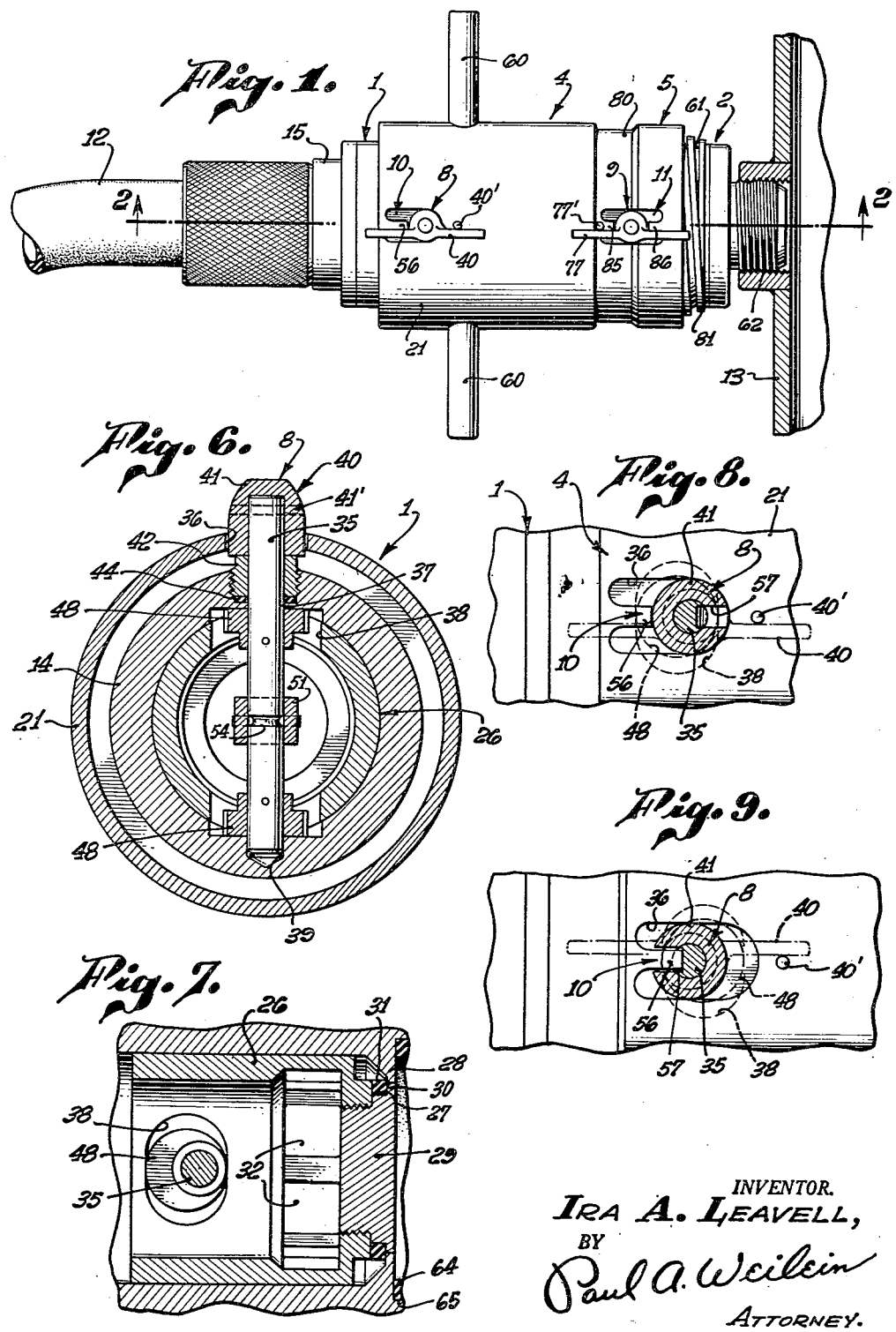
INVENTOR.
IRA A. LEAVELL,
BY
Paul A. Weilein
ATTORNEY.

Dec. 11, 1956    I. A. LEAVELL    2,773,706
VALVED COUPLING
Filed Oct. 10, 1952    2 Sheets-Sheet 2
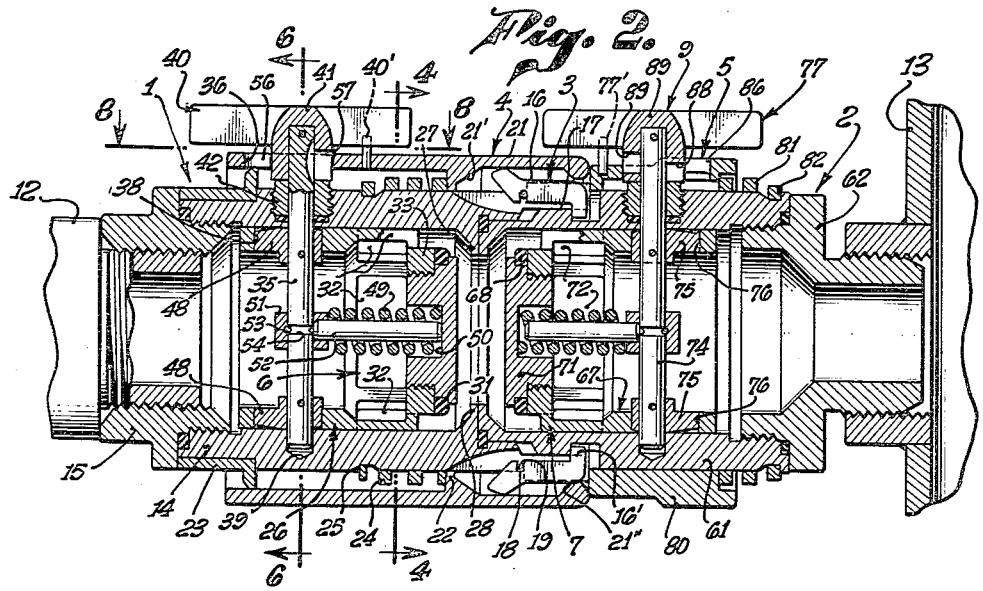
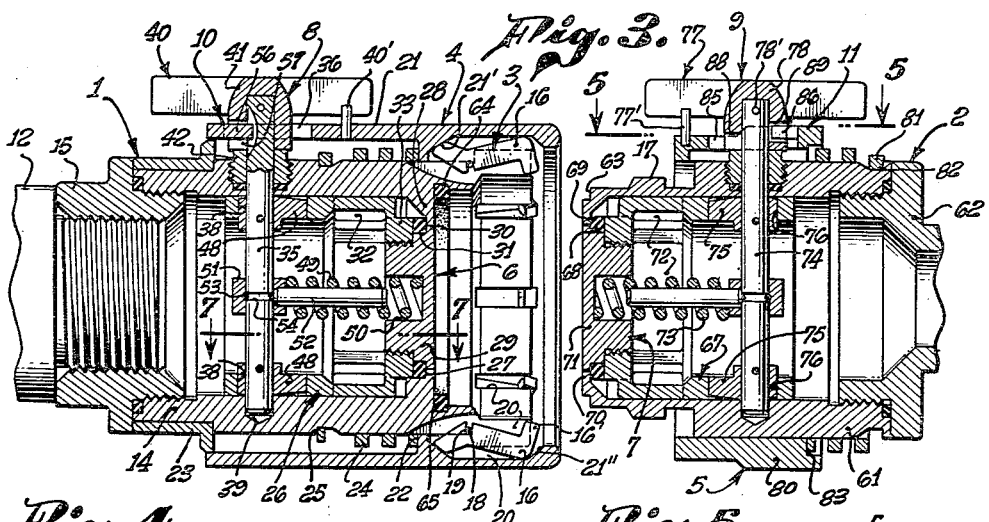
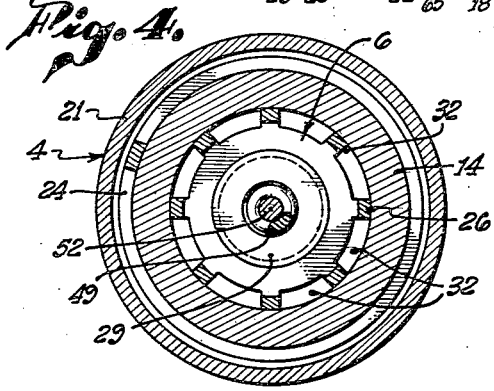
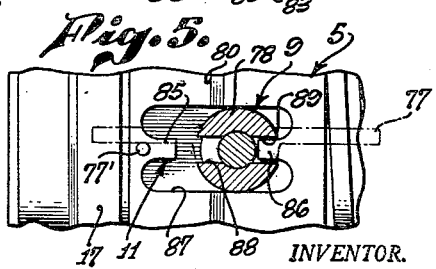
INVENTOR.
IRA A. LEAVELL,
BY
Paul A. Weilein
ATTORNEY.

United States Patent Office 2,773,706
Patented Dec. 11, 1956

2,773,706

VALVED COUPLING

Ira A. Leavell, Alhambra, Calif., assignor to E. B. Wiggins Oil Tool Co., Inc., Los Angeles, Calif., a corporation of California Application October 10, 1952, Serial No. 314,193

13 Claims. (Cl. 284—19)

This invention relates to couplings for detachably connecting conduits for conveying fluids, and more particularly to couplings in which the companion coupling members are closed by valves when uncoupled.

Couplings of this type are exemplified in U. S. Letters Patent 2,425,500, issued August 12, 1947, for Valved Coupling, and in the application for U. S. Letters Patent, Serial No. 73,783, filed January 31, 1949, for Quick Detachable Coupling, now abandoned. These couplings may be uncoupled by releasing locking dogs for holding the companion coupling members in coupled relation, the valves therein automatically closing the coupling members incident to uncoupling movement thereof.

It is an object of the present invention to provide an improved valved coupling, which is positive in operation and precludes all possibility of the failure of the valves to close when uncoupling the coupling members, as well as the possibility of the valves opening and causing leakage before the coupling members are properly coupled.

It is another object of this invention to provide a coupling such as described, in which the valves in the respective coupling members optionally may be opened and closed while the coupling members are locked in coupled relation.

It is another object of this invention to provide a coupling such as described, in which the valves must be closed before the releasing means can be manipulated to permit uncoupling of the coupling members.

It is a further object of this invention to provide a coupling such as described, which is reliable and safe for detachably coupling conduits for conducting fluids, acids and gasses which are dangerous and must be handled with extreme care to prevent waste, personal injuries and property damage.

It is another object of this invention to provide a coupling such as described, having a novel valve actuating means operable exteriorly of the coupling for opening and closing the valves in the respective coupling members.

It is a further object hereof to provide in a coupling such as described, an improved valve means which assures a positive and leak-proof closure of the passages in the coupling members.

It is another object of this invention to provide a valved coupling such as described, wherein releasing elements on the two coupling members must be moved at the same time to permit of uncoupling of such members, and are prevented from such movement when the valve in either member is open or when the valves in both members are opened, but are operable to permit separation of the coupling members when both valves are closed, thereby doubly assuring that the passages through the coupling members will be closed before separation of such members may be commenced.

This invention possesses many other advantages and has other objects which may be made more easily apparent from a consideration of one embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view of a coupling embodying the present invention, as it would appear in one use thereof;

Fig. 2 is an enlarged longitudinal sectional view taken on the line 2—2 of Fig. 1;

Fig. 3 is a sectional view similar to Fig. 2, showing the coupling uncoupled;

Fig. 4 is a cross sectional view taken on the line 4—4 of Fig. 2;

Fig. 5 is a fragmentary sectional view taken on the line 5—5 of Fig. 3;

Fig. 6 is a cross sectional view taken on the line 6—6 of Fig. 2;

Fig. 7 is a fragmentary sectional view taken on the line 7—7 of Fig. 3;

Fig. 8 is a fragmentary sectional view taken on the line 8—8 of Fig. 2, showing the restraining means for the female coupling member as operative to prevent uncoupling of the coupling members while the valves are open; and Fig. 9 is a sectional view corresponding to Fig. 8, but showing the restraining means for the female coupling member in position to which it is moved after closing the valves and separating the coupling members.

Generally, a valved coupling embodying the present invention includes tubular female and male, or what may be termed socket and nipple, coupling members 1 and 2 adapted to be held in coupled relation by locking means 3 subject to release by the aid of releasing means 4 and 5 operable on the members 1 and 2 respectively.

Valve means 6 and 7 are provided to open and close the passages in the coupling members 1 and 2 respectively, responsive to actuation of operating means 8 and 9 on the respective coupling members.

In accordance with this invention, leakage or spillage is prevented when uncoupling the members 1 and 2 and while said members are uncoupled, as well as when coupling them. For this purpose, provision is made for preventing operation of the releasing means 4 and 5 and consequent uncoupling of the members 1 and 2 while the valve means 6 and 7 are open, and for restraining operation of the valve means 6 and 7 to open the passages through the coupling members when the latter are uncoupled. Accordingly, restraining means 10 is associated with the releasing means 4 and the valve operating means 8 for the valve means 6 of the female coupling member 1. A similar restraining means 11 is associated with the releasing means 5 and the valve operating means 9 for the valve 7 of the male coupling member 2. These restraining means prevent operation of the releasing means 4 and 5 when the valve operating means 8 and 9 are in position to maintain the valve means 6 and 7 open and will restrain operation of the means 8 and 9 for opening the valve means when the coupling members are uncoupled. However, when the members 1 and 2 are coupled and locked by the locking means 3, the operating means 8 and 9 may be selectively operated to open and close the valve means 6 and 7.

One use of the coupling of this invention, as shown in Fig. 1, consists in attaching the female or socket coupling member 1 to a conduit 12, while the male or nipple member 2 is connected with a vessel, such as a tank 13, whereby upon coupling the members 1 and 2 fluid may be conducted to or from the tank. However, it should be understood that the coupling may be put to any use for detachably coupling conduits or the like where it is essential that leakage of fluid must be prevented and accidental or unintentional opening of the valves is precluded.

The female or socket member 1 includes a tubular body 14 having a reduction fitting 15 screwed into one end thereof to provide for connecting the member 1 with the conduit 12 or the like. At the other end of the body 14, are a plurality of locking dogs 16 which, with a flange 17 on the male or nipple member 2, form the locking means 3 for releasably holding the coupling members in coupled relation.

The locking dogs 16 are pivotally mounted between their ends on a snap ring 18 mounted in an external groove 19 in the body member 14. These dogs are pivotally movable in slots 20 in the end of the body member and retained in pivotal connection with the ring 18 by contact with the inner surface of a sleeve 21 surrounding the body 15 and axially movable relative thereto.

The sleeve 21 forms the major part of the releasing means 4, as by forward movement thereof it causes an annular cam surface 21' thereon to contact the rear ends of the dogs 16 and rock the dogs so as to move the outer hook ends 16' thereof out of locking engagement with the flange 17 on the nipple member 2. Upon being retracted, the releasing sleeve 21 causes the enlarged outer end 21" thereof to contact and rock the dogs 16 so as to move the hook ends 16' into locking engagement with the flange 17 of the coupling member 2 when the latter is socketed in the coupling member 1, as shown in Fig. 1. This causes the coupling members to be securely locked in coupled relation.

The sleeve 21 is circumferentially spaced from the body 14 and slidably supported thereon by means of an internal flange 22 on the sleeve, and a flanged guide ring 23 on the body. A spring 24 surrounds the body 14 in the annular space between the body and the sleeve, and is confined between the flange 22 and a shoulder 25 on the body, so as to urge the sleeve forwardly, normally to hold the dogs 16 in releasing position, as shown in Fig. 2.

The valve means 6 in the female member 1 includes a tubular valve 26 open at its rear end and having a sliding fit in the bore of the body 14 for axial movement into and out of contact with an annular seat 27 on a flange 28 formed at a point spaced inwardly of the forward end of the bore. The forward end of the valve 26 is reduced and internally threaded to receive a plug 29 closing the bore through the valve and having a flange 30 which confines a sealing ring 31 between it and the adjacent end of the valve. The sealing ring 31 is adapted to seal against the seat 27 when the valve 26 is closed, as shown in Fig. 3.

When the valve 26 is opened, as shown in Fig. 1, ports 32 in the cylindrical wall of the valve permit the passage of fluid through the valve 26 and bore of the body 14. It should be noted that the ports 32 also extend axially through the flange portion 33 of the valve formed by reducing the forward end of the valve, as shown in Figs. 2 and 4, whereby fluid may flow through these ports and the bore through the body 14 when the valve is open.

As shown in Fig. 3, when the valve 26 is closed, the outer face of the plug 29 is flush with the outer face of the flange 28 while the sealing ring 31 is compressed and sealed against the seat 27. At this time the flange 30 of the plug 29 extends into the reduced portion of the bore through the body 14 formed by the flange 28, thereby effectively closing this bore.

The operating means 8 for the tubular valve 26 in the female member 1, includes a rotatable cam shaft 35 extending into the body 14 through a longitudinal slot 36 in the releasing sleeve 21, an opening 37 in the body 14 and cam-receiving slots 38 in the valve 26. The inner end of this shaft is mounted in a bearing socket 39 formed internally of the body 14, while the outer end of the shaft projects beyond the sleeve 21 and mounts a handle 40 by means of which the shaft may be turned to open and close the valve 26. This handle has a cylindrical hub 41 secured to the shaft 35 by means of a pin 41'; the hub extending into the slot 36 in the sleeve 21 so as to contact a gland 42 surrounding the shaft and screwed into a threaded counterbore of the opening 37 against a sealing gasket 44, thereby forming a leak-proof bearing for the shaft 35. Movement of the handle 40 for opening and closing the valve 26 is limited by a stop pin 40' on the sleeve 21, the handle being movable through approximately 180°.

A pair of cams 48 foxed on the shaft, are operable in the cam-receiving slots 38 in the tubular valve 26, as shown in Figs. 2, 3, 6 and 7, for moving this valve axially to open and close the bore through the body 14, responsive to appropriate turning of the handle 40.

The valve 26 is urged toward the seat 27 by means of a spring 49 having one end mounted in a socket 50 in the valve plug 29 and its other end bearing against a collar 51 mounted on the shaft 35. This collar supports a pin 52, which in turn supports the spring 49. Accordingly, the collar 51 is supported on the shaft 35 by means of a pin 53 extending therethrough so as to engage in a circumferential groove 54 in the shaft, whereby the shaft is free to turn relative to the collar.

The restraining means 10 on the female or socket member 1 controls the operation of the valve 26 as well as the operation of the releasing sleeve 21. This restraining means includes cooperable elements on the handle hub 41 and the sleeve 21 respectively. The element on the sleeve 21 is in the form of a projection 56 extending forwardly from the rear end of the slot 36 in the sleeve. The element on the hub 41 is in the form of a recess 57. The recess 57 is positioned so that when the valve 26 is unseated, the projection 56 will contact the side of the hub 41 opposite the recess 57 as shown in Figs. 2 and 8 and prevent movement of the sleeve 21 in the direction for uncoupling the coupling members 1 and 2. This makes it necessary that the valve 26 be seated by operation of the shaft 35 before the sleeve is free to move forwardly for releasing the locking dogs 16 and uncoupling the members 1 and 2.

In moving the valve 26 to seated position, the handle hub 41 is turned so as to align the recess 57 with the projection 56, thereby permitting the projection to enter the recess as the sleeve 21 is moved forward to move the dogs 16 into position releasing coupling members 1 and 2 for uncoupling thereof, provided however the valve means 7 in the coupling member 2 is closed.

It should be noted that when the handle 40 is turned in the direction for closing the valve 26, the stop pin 40' will limit the movement of the handle to the exact position in which the recess 57 comes into alignment with the projection 56. When the handle 40 is moved to open the valve 26, the pin 40' limits movement of the handle to assure that the sleeve 21 cannot be moved in the direction for releasing the locking means and permitting uncoupling of the coupling member. Figs. 8 and 9 indicate how the pin 40' limits the movement of the handle 40 in the manner next above described.

It is necessary that the valve means 7 be closed before the coupling members 1 and 2 may be separated, because the releasing means 5 on the coupling member 2 is restrained from axial movement by the means 11 and obstructs releasing movement of the sleeve 21 until the valve means 7 is closed and causes the restraining means 11 to release the means 5 in a manner which will be hereinafter fully described. Movement of the sleeve 21 for causing the locking dogs 16 to lock and unlock, may be facilitated by providing handles 60 projecting from opposite sides of the sleeves as shown in Fig. 1.

The male coupling member or nipple 2, includes a tubular body 61 open at both ends and provided at its rear end with a reduction fitting 62 for attaching the coupling member to the tank 13 or a conduit, as the case may be. The body 61 is adapted to extend into the enlarged forward end of the bore of the female member 1, there being a shoulder 63 on the body 61 for engaging a sealing ring 64 seated in a recess 65 in the bore of the body 14 of the coupling member 1. This shoulder will contact and compress the ring 64 before the forward end of the body 61 abuts the flange 28 in the bore of the body 14, thereby forming an effective seal between the coupling members 1 and 2 when the locking dogs 16 are moved into locking engagement with the flange 17 on the body 61 to lock the members 1 and 2 in coupled relation.

The valve means 7 in the male coupling member 2 includes a tubular valve 67 of the same construction as the valve 26, adapted to have a sealing ring 68 thereon engage a valve seat 69 formed on the inner surface of a flange 70 at the forward end of the body 61. A plug portion 71 of the valve 67 closes the forward end of the bore of the body 61 when the valve 67 is seated, the valve remaining seated after the coupling members 1 and 2 are locked together, and thereafter requiring operation of the operating means 9, in order to be unseated. Ports 72, identical with the ports in the valve 26, are provided in the valve 67.

Spring means 73, corresponding to the spring means for the valve 26 in the coupling member 1, is provided to urge the valve 67 towards the seat 69.

The operating means 9 for the valve 67 in the male coupling member 2, is substantially the same as the operating means 8 for the valve 26 in the coupling member 1. It includes a cam shaft 74, mounting cams 75 which operate in cam slots 76 in the valve 67 in the same manner as in the coupling member 1, to move the valve axially into and out of seated position responsive to rotation of the shaft. The shaft 34 is provided with a handle 77 having a cylindrical hub 78 fixed by the aid of a pin 77' on the outer end of the shaft.

The releasing means 5 on the male coupling member 2 is in the form of a sleeve 80 slidably mounted on the body 61 in a manner similar to the mounting of the sleeve 21, with provision however for causing the forward end of the sleeve 80 to contact the forward end of the sleeve 21 (see Fig. 2) when the coupling members 1 and 2 are locked in coupled relation. Accordingly, the sleeve 80 is urged forwardly by means of a spring 81 surrounding the body 61 and confined between shoulders 82 and 83 on the body and sleeve respectively.

The restraining means 11 on the coupling member 2 embodies projections 85 and 86 at opposite ends of a slot 87 extending longitudinally in the sleeve 80. This slot permits of sliding of the sleeve 80 in the same manner as the sleeve 21, when the projections 85 and 86 are properly aligned with related recesses 88 and 89 on opposite sides of the handle hub 78. As shown in Fig. 3, the projection 85 and the related recess 88 are inwardly offset from the plane of the projection 86 and its related recess 89. As a result of this arrangement, when the valve 76 is in open position, as shown in Fig. 2, the handle hub 78 is in a position disposing the recesses 88 and 89 out of registry with the projections 85 and 86 respectively, which latter therefore obstruct sliding movement of the sleeve 80 in either direction, but will not obstruct rotative movement of the shaft. Thus, the shaft 74 may be turned to open and close the valve 67 as desired after the coupling members 1 and 2 are locked in coupled relation. A stop pin 77' is provided on the sleeve 80 to limit the turning of the handle to "off" and "on" positions as indicated in Fig. 5.

When the valve 67 in the coupling member 2 is closed while the coupling members are coupled, the projection 85 is in alignment with its related coplanar recess 88, as shown in Figs. 3 and 5. At this time the recess 86 and the projection 89 are also in registry, but the sleeve 80 is restrained from movement toward the coupling member 1 by its contact with the sleeve 21 on the coupling member 1. The sleeve 21 is also restrained against inward movement at this time, as the handle hub 41 is disposed at the forward end of the slot 36 in the sleeve, as shown in Figs. 1 and 8. When the valve 67 is closed, it is also necessary to close the valve 26 before the coupling members may be uncoupled. Either valve may be closed first, but both must be closed before uncoupling may be effected. Likewise, when the coupling members are being coupled, the valves are closed and so remain, it being necessary to lock the coupling members in coupled relation before the valves may be opened.

Operation

When the coupling members 1 and 2 are uncoupled, the valves 26 and 67 therein are closed, as shown in Fig. 3. Upon bringing the coupling members together so that the male member 2 extends into the female member 1, and then pulling or pushing the sleeve 21 rearwardly, the coupling members will be locked in coupled relation. As the sleeve 21 is moved in this manner, the end 21" thereof will contact the forward ends of the locking dogs 16, as the cam surface 21' on the sleeve moves from contact with rear ends of the dogs, thereby rocking the dogs to engage the hook ends 16' thereof behind the flange 17 on the member 2 and locking the coupled members in coupled relation.

It should be noted that prior to the coupling of the members 1 and 2, the valves 26 and 67 therein are locked in closed position by the sleeves 21 and 80 respectively. Sleeve 21 at this time, as shown in Figs. 3 and 9, is in retracted position so that the projection 56 thereon is engaged in the recess 57 in the socket 41 of the handle 40, being held in this position by the spring 24 and preventing turning of the handle 40 to open the valve 26. The sleeve 80 on the member 2, at this time, as shown in Figs. 3 and 5, is urged forwardly by the spring 81 so that the projection 86 thereon is engaged in the recess 89 in the socket 78 of the handle 77, and prevents turning of the handle to open the valve 67.

Also, it should be noted the valves 26 and 67 remain closed and are in no way effected by the operation of locking the coupling members in coupled relation, it being necessary to manually open the valves after the coupling members are coupled.

If it is desired to open the valve in the member 1 for any purpose, while the coupling members are uncoupled, the operator must pull the sleeve 21 rearward and so hold it against the action of the spring 24 to hold the projection 56 out of the recess 57 in the handle 40, in order that the latter may be turned to open the valve.

Likewise, the valve 67 in the male member 2 may be intentionally opened when the coupling members are uncoupled, it being necessary in this case, to move the sleeve 80 rearwardly against the action of the spring 81 to retract the projection 86 on the sleeve 80 from the recess 89 in the handle 77, and so hold the sleeve, before the handle may be turned to open the valve.

These locking provisions make it necessary to intentionally open the valves, thereby precluding unintentional or accidental opening thereof with possible serious consequences where the coupling is used in connection with conduits for conveying noxious, dangerous or lethal acids or fluids requiring extreme care in the handling thereof.

After the coupling members are locked in coupled relation, the valves 26 and 67 may be opened and closed at will, without releasing the locking means, holding the members coupled. Moreover, this operation of the valves does not effect the neutral position of the restraining means 10 and 11, as shown in Fig. 2, inasmuch as the springs 24 and 81 are prevented at this time from moving the mutually engaged sleeves 21 and 80.

In order to uncouple the coupling members 1 and 2, it is necessary that the valves 26 and 67 be closed. Either valve may be closed first, but both must be closed before the sleeves 21 may be moved forwardly to rock the locking dogs 16 out of engagement with the flange 17 of the male member 2.

When the handle 40 is turned to open the valve 26, the recess 57 in the handle hub 41 is aligned with the projection 56, as the handle contacts the stop pin 41; thereby freeing the sleeve 21 for forward movement to cause the cam surface 21' thereon to contact the rear ends of the locking dogs 16 and rock these dogs out of locking contact with the flange 17 on the male member 2. However, unless the sleeve 80 on the male member 2 is free to move, the member 21 is restrained against movement for releasing the locking dogs. In order to release the sleeve 80, the handle 77 must be turned to close the valve 67. In this turning of the handle 77, the recess 88 is moved into registry with the projection 85 on the sleeve 80, and the recess 89 is brought into registry with the projection 86, thereby releasing the sleeve 80 for movement whereby the sleeve 21 may be moved to release the locking dogs. This registry of these projection and recesses is assured by the handle 77 coming to rest against the stop pin 77' as shown in Fig. 3.

The double locking of the releasing means as here provided, assures that the valves in both of the coupling members will be closed before the coupling members may be uncoupled, thereby making the coupling safe for use with conduits or the like for conveying acids, highly volatile and other harmful fluids which must be confined in the conduits and coupling without dripping or leakage, to prevent waste, personal injury and property damage.

I claim:

1. In a valved coupling: a pair of axially separable coupling members having through bores cooperable when said members are coupled to form a passage through said members; locking means on one of said members engaged with the other of said members for holding said members in coupled relation; sleeve means on each of said members; releasing means on one of said sleeve means for releasing said locking means; valve means in each of said members; valve operating means in each of said valve means for opening and closing said passage; restraining means carried by each of said valve operating means and each of said sleeve means respectively, for preventing sliding of the sleeve means in a direction for releasing said locking means when either of said valve means is open; and means releasing said sleeve means for sliding in a direction for the release of said locking means when both of said valve means are closed.

2. In a valved coupling: a pair of coupling members having through bores cooperable when said members are coupled to form a passage through said members; locking means on one of said members engaged with the other of said members for locking said members in coupled relation; a sleeve movable axially on each of said members; releasing means on one of said sleeves for releasing said locking means upon joint axial sliding movement of said sleeves; valve means in each of said members for opening and closing said passage; valve actuating means independently manually operable on each of said members for actuating said valve means; restraining elements on each of said valve actuating means and each of said sleeves respectively, cooperable for restraining said joint movement of said sleeves when either of said valve means is opened; and means releasing each of said sleeves for sliding in a direction for release of said locking means when both of said valve means are closed.

3. A coupling comprising: a pair of coupling members having bores therethrough cooperable when said members are coupled to provide a passage through said members; locking elements pivoted on one of said members engaged with the other of said members to hold said members in coupled relation; sleeves mounted on said members for independent axial sliding movement as well as joint axial sliding movement; means on one of said sleeves for engaging and moving said locking elements into and out of locking engagement with said other member upon said joint axial movement of said sleeves; valve means in each of said members; valve operating means for each valve means; restraining elements carried by each valve means and by each of said valves operating means respectively, for preventing sliding of the sleeve means in a direction for releasing said sleeves when either of said valve means is opened; means releasing said sleeves for said joint axial movement operable on closing both of said valve means; and means releasably holding said valve means closed when said members are uncoupled; said last named means releasing said valve means for actuation responsive to the coupling of said coupling members.

4. A valved coupling comprising: a pair of coupling members having bores adapted to form a passage through said members when said members are coupled; locking means on one of said mebers engaged with the other of said members to hold said members in coupled relation; valve means in the bore of each of said members; a shaft rotatable in each of said members; means embodied in each of said members for opening and closing the valve means therein responsive to rotation of the shaft therein; a sleeve axially movable on one of said members; means on said sleeve for engaging and moving said locking means into locking position responsive to movement of said sleeve in a direction away from said other member; means on said sleeve for engaging and moving said locking means out of said locking position responsive to movement of said sleeve in a direction toward said other member; spring means urging said sleeve in a direction toward said other member; means operatively associated with said sleeve and the shaft on said one member, cooperable for preventing movement of said sleeve toward said other member when the valve means in said one member is open; means releasing said sleeve when said valve means in said one member is closed; means on said sleeve and the shaft in said one member, cooperable to restrain actuation of the shaft to open the valve means in said one member when said members are uncoupled; means releasing said shaft in said one member responsive to movement of said sleeve in the direction for locking said members in coupled relation; means including a sleeve movable axially on said other coupling member and engageable with said first named sleeve to prevent said movement of said sleeve toward said other member when the valve means in said other coupling member is open; and means embodied in said other coupling member releasing said first named sleeve for movement toward said other member when the valve means in said other member is closed.

5. A valved coupling comprising: a pair of coupling members having bores adapted to form a passage through said members when said members are coupled; locking means on one of said members engaged with the other of said members to hold said members in coupled relation; valve means in the bore of each of said members; a shaft rotatable in each of said members; means embodied in each of said members for opening and closing the valve means therein responsive to rotation of the shaft therein; a sleeve axially movable on one of said members; means on said sleeve for engaging and moving said locking means into locking position responsive to movement of said sleeve in a direction away from said other member; means on said sleeve for engaging and moving said locking means out of said locking position responsive to movement of said sleeve in a direction toward said other member; spring means urging said sleeve in a direction toward said other member; means operatively associated with said sleeve and the shaft on said one member cooperable for preventing movement of said sleeve toward said other member when the valve means in said one member is open; means releasing said sleeve when said valve means in said one member is closed; means on said sleeve and the shaft in said one member, cooperable to restrain actuation of the shaft to open the valve means in said one member when said members are uncoupled; means releasing said shaft in said one member responsive to movement of said sleeve in the direction for locking said members in coupled relation; means including a sleeve movable axially on said other coupling member and engageable with said first named sleeve to prevent said movement of said sleeve toward said other member when the valve means in said other coupling member is open; means embodied in said other coupling member releasing said first named sleeve for movement toward said other member when the valve means in said other member is closed; and means embodied in said other coupling member for releasably holding in closed position the valve means in said other coupling when said coupling members are uncoupled.

6. A valved coupling comprising: a pair of axially separable tubular coupling members each having a bore therethrough adapted to form a passage through said members when coupled; locking means on one of said members engaged with the other of said members for releasably locking said members in coupled relation; a shaft rotatably mounted in each of said members; valve means in the bore of each of said members; means connecting said shafts with said valve means for opening and closing said valve means on rotation of said shafts; a sleeve surrounding said one member for movement axially thereof; means on said sleeve for moving said locking means into locking position upon movement of said sleeve away from said other member; means on said sleeve for moving said locking means to release said members for uncoupling when said sleeve is moved toward said other member; spring means urging said sleeve in said releasing direction; a second sleeve axially movable on said other coupling member; said second sleeve abutting the first mentioned sleeve and preventing movement thereof in said releasing direction when said members are coupled; spring means urging said second sleeve in the direction for abutting the first mentioned sleeve; means controlled by the relative positions of said shafts and said sleeves for preventing movement of said sleeves while the valve means in said members are open; and means freeing said sleeve for movement to release said locking means when said valve means in said members are closed.

7. A valved coupling comprising: a pair of axially separable tubular coupling members each having a bore therethrough adapted to form a passage through said members when coupled; locking means on one of said members engaged with the other of said members for releasably locking said members in coupled relation; a shaft rotatably mounted in each of said members; valve means in the bore of each of said members; means connecting said shafts with said valve means for opening and closing said valve means on rotation of said shafts; a sleeve surrounding said one member for movement axially thereof; means on said sleeve for moving said locking means into locking position upon movement of said sleeve away from said other member; means on said sleeve for moving said locking means to release said members for uncoupling when said sleeve is moved toward said other member; spring means urging said sleeve in said releasing direction; a seocnd sleeve axially movable on said other coupling member; said second sleeve abutting the first mentioned sleeve and preventing movement thereof in said releasing direction when said members are coupled; spring means urging said second sleeve in the direction for abutting the first mentioned sleeve; said second sleeve being movable axially against the action of said last named spring means when said first mentioned sleeve is moved in said releasing direction; means on said other member restraining movement of said second sleeve against the action of said last named spring means when the valve means in said other member is opened; means releasing said second sleeve for movement against the action of said last named spring means responsive to the closing of the valve means in said other member; means on said one member preventing releasing movement of said first mentioned sleeve when the valve means in said one member is opened; and means releasing said first mentioned sleeve when the valve means in said one member is closed.

8. In a valved coupling: a pair of tubular coupling members; cooperable locking elements on said coupling members; the locking elements on one of said coupling members being pivoted thereon for movement and releasably engaging the locking element on the other coupling member to hold said members coupled; a sleeve slidable on said one coupling member; means on said sleeve for moving said pivoted locking elements into locking engagement with said locking element on said other coupling member upon sliding of said sleeve in a direction away from said other coupling member; means on said sleeve for moving said pivoted locking elements out of locking contact with the locking element on said other coupling member upon sliding said sleeve toward said other coupling member; a valve in each coupling member; operating means for opening and closing each valve; restraining elements carried by each coupling member for preventing sliding of said sleeve toward said other coupling member when said valve in said one coupling member is open; and means embodied in each coupling member releasing said sleeve for sliding in said opposite direction when said valves in both of said members are closed.

9. In a valved coupling: a pair of tubular coupling members; locking elements mounted on said coupling members; the locking elements on one of said coupling members being pivoted for movement and releasably engaging the locking element on the other coupling member to hold said members coupled; a sleeve slidable on said one coupling member; means on said sleeve for moving said pivoted elements into locking engagement with the locking element on said other coupling member upon sliding of said sleeve in a direction away from said other coupling member; means on said sleeve for moving said pivoted locking elements out of locking contact with the locking element on said other coupling member upon sliding said sleeve toward said other coupling member; spring means urging said sleeve toward said other coupling member; a valve in each of said coupling members; a shaft in each coupling member; means connecting each shaft with its associated valve for opening and closing such valve responsive to rotation of said shaft; means carried by said sleeve and the shaft in said one coupling member, cooperable for preventing sliding of the sleeve in the direction for releasing said pivoted locking elements when said valve in said one coupling member is open; and means releasing said sleeve for sliding toward said other coupling member when said valve in said one coupling member is closed.

10. In a valved coupling: a pair of tubular coupling members; locking elements mounted on one of said coupling members for movement and releasably engaging the other coupling member to hold said members coupled; a sleeve slidable on each coupling member; means on the sleeve on one of said coupling members for moving said elements into locking engagement with said other coupling member upon sliding of said sleeve in a direction away from said other coupling member; means on the sleeve on said one coupling member for moving said locking elements out of locking engagement with said other coupling member upon sliding said sleeve toward said other coupling member; a valve in each coupling member; a shaft in each coupling member; each of said sleeves having a longitudinal slot through which the associated shaft is extended; means connecting said shafts with said valves operable for opening and closing said valves responsive to rotation of said shafts; spring means urging said sleeves toward one another; means releasing the sleeve on said one coupling member for sliding toward said other coupling member upon rotation of the shaft on said one coupling member to a position closing the associated valve; said spring means moving said sleeves toward one another upon uncoupling said coupling members; and means on said sleeves and said shafts respectively for restraining movement of said shafts to open said valves when said coupling members are uncoupled.

11. In a valved coupling: a pair of tubular coupling members; locking elements mounted on one of said coupling members for movement and releasably engaging the other coupling member to hold said members coupled; a sleeve slidable on said one coupling member; means on said sleeve for moving said elements into locking engagement with said other coupling member upon sliding said sleeve in a direction away from said other coupling member; means on said sleeve for moving said locking elements out of locking contact with said other coupling member upon sliding said sleeve toward said other coupling member, a valve in said one coupling member; a shaft in said one coupling member; said sleeve having a longitudinal slot through which said shaft extends; means connecting said shaft with said valve operable for opening and closing said valve responsive to rotation of said shaft; spring means urging said sleeve toward said other coupling member; means on said shaft and said sleeve respectively, cooperable to restrain movement of said sleeve toward said other coupling member when said shaft is rotated to a position opening said valve; means releasing said sleeve for sliding movement toward said other coupling member upon movement of said shaft to a position closing said valve; a valve in said other coupling member; operating means for opening and closing the valve on said other coupling member; means on said other coupling member controlled by said operating means for restraining said movement of said sleeve when the valve in said other coupling member is open; and means releasing said sleeve for movement toward said other coupling member when the valve in said other coupling member is closed; said spring means moving said sleeve toward said other coupling member upon separation of said coupling members; and means embodied in said coupling members for releasably holding said valves closed when said members are uncoupled.

12. A valved coupling member comprising: a tubular member; means on said tubular member operable for coupling said tubular member with a companion coupling member; a valve in said tubular member; a shaft rotatable in said tubular member; means connecting said shaft with said valve for opening and closing said valve responsive to rotation of said shaft; spring means urging said valve to closed position; a sleeve slidable axially on said tubular member; said sleeve having a slot extending longitudinally thereof; said shaft extending through said slot; means on said shaft forming a recess; a projection on said sleeve; said projection and recess registering with one another whereby movement of said sleeve moves the projection into said recess when the shaft is turned to close said valve; and spring means urging said sleeve in a direction to engage said projection in said recess to prevent movement of said shaft for opening said valve.

13. In a valved coupling: a tubular female coupling member; a tubular male coupling member; said coupling members having bores extending therethrough; cooperable locking elements on said members releasably holding said members in coupled relation; a sleeve mounted on each of said members for sliding movement relative thereto; spring means urging said sleeves to contact one another when said members are coupled; means on the sleeve on said female coupling member for releasing said locking elements upon sliding movement of said sleeve in a direction toward said male member, said sleeve on said male member moving responsive to said releasing movement of the sleeve on said female member; valve means in each of said members operable for opening and closing the bore therein; said valve means including a rotary shaft; elements carried by said sleeves and said shafts cooperable for preventing said releasing movement of said sleeves when said shafts are in position to open said valves; and means operable for releasing said sleeves when said shafts are in positions closing said valves.

References Cited in the file of this patent

UNITED STATES PATENTS

| 2,048,936 | Kremser | July 28, 1936 |
| 2,425,500 | Wiggins | Aug. 12, 1947 |
| 2,444,414 | Anderson | July 6, 1948 |
| 2,625,410 | Crowley | Jan. 13, 1953 |
| 2,637,572 | Bruce | May 5, 1953 |
| 2,678,834 | Courtot | May 18, 1954 |